United States Patent

Toraason

Patent Number: 5,242,033
Date of Patent: Sep. 7, 1993

[54] HIGH POWER GEAR COOLING SYSTEM

[75] Inventor: Clifford M. Toraason, Cincinnati, Ohio

[73] Assignee: General Electric Company, Cincinnati, Ohio

[21] Appl. No.: 759,386

[22] Filed: Sep. 13, 1991

[51] Int. Cl.$^5$ .............................................. F01M 1/02
[52] U.S. Cl. ................................. 184/6.12; 184/6.13; 184/6.24; 74/468; 210/171; 210/459
[58] Field of Search .............. 210/171, 435, 446, 459; 74/468, 467; 184/6.13, 6.12, 11.1, 11.2, 11.4, 13.1, 11.3, 11.5, 6.24

[56] References Cited

U.S. PATENT DOCUMENTS

| | | | |
|---|---|---|---|
| 2,281,914 | 5/1942 | Brooks | 74/468 |
| 2,681,126 | 6/1954 | Searls | 184/6.12 |
| 2,910,142 | 10/1959 | Almen | 184/6.12 |
| 3,065,822 | 11/1962 | McAfee et al. | 184/11.1 |
| 3,146,629 | 9/1964 | Schmitter | 74/467 |
| 3,365,913 | 1/1968 | Shields | 184/6.12 |
| 3,424,022 | 1/1969 | Greenberg et al. | 74/468 |
| 3,502,177 | 3/1970 | Christie | 184/11.1 |
| 3,788,426 | 1/1974 | Hull, Jr. | 184/6.12 |
| 3,822,607 | 7/1974 | Tharaldsen | 74/468 |
| 4,573,373 | 3/1986 | Shimizu et al. | 74/468 |
| 4,667,774 | 5/1987 | Roberge | 184/6.12 |
| 4,696,201 | 9/1987 | Hattori et al. | 74/467 |
| 4,771,864 | 9/1988 | Lorimor et al. | 184/6 |
| 4,872,530 | 10/1989 | Burgess | 74/468 |

FOREIGN PATENT DOCUMENTS 1017863 10/1957 Fed. Rep. of Germany ........ 74/467

Primary Examiner—James C. Yeung
Assistant Examiner—Alan B. Cariaso
Attorney, Agent, or Firm—Jerome C. Squillaro; John R. Rafter

[57] ABSTRACT

A cooling system for a high speed gear includes a plurality of passages extending through the gear and a hydraulic slip ring for delivering cooling fluid to the passages and for scavenging cooling fluid after it passes through the passages. The slip rings include collector rings and scoops, as well as the nozzles mounted in the passages for spraying cooling fluid into a baffled collector ring.

17 Claims, 4 Drawing Sheets

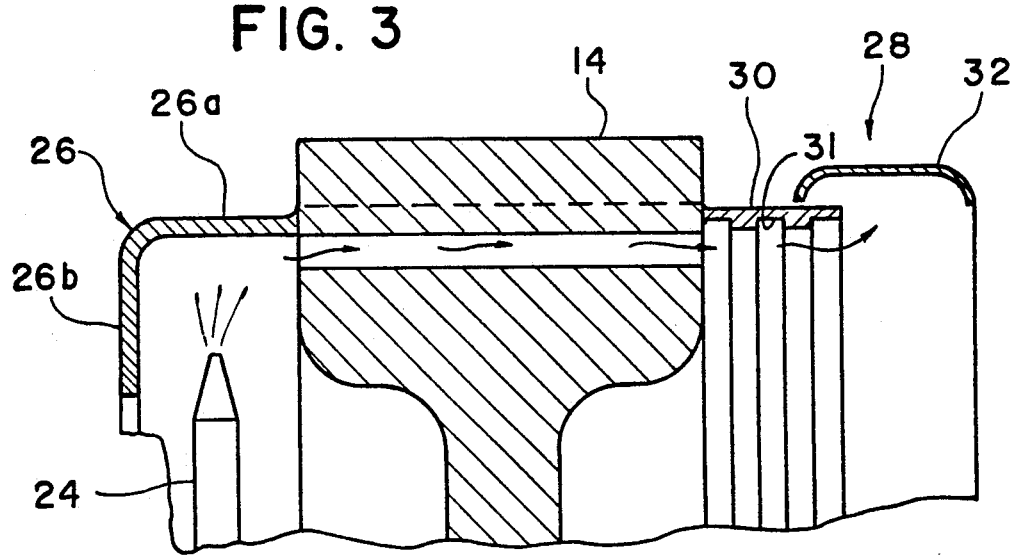
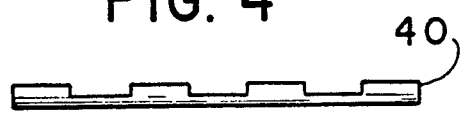
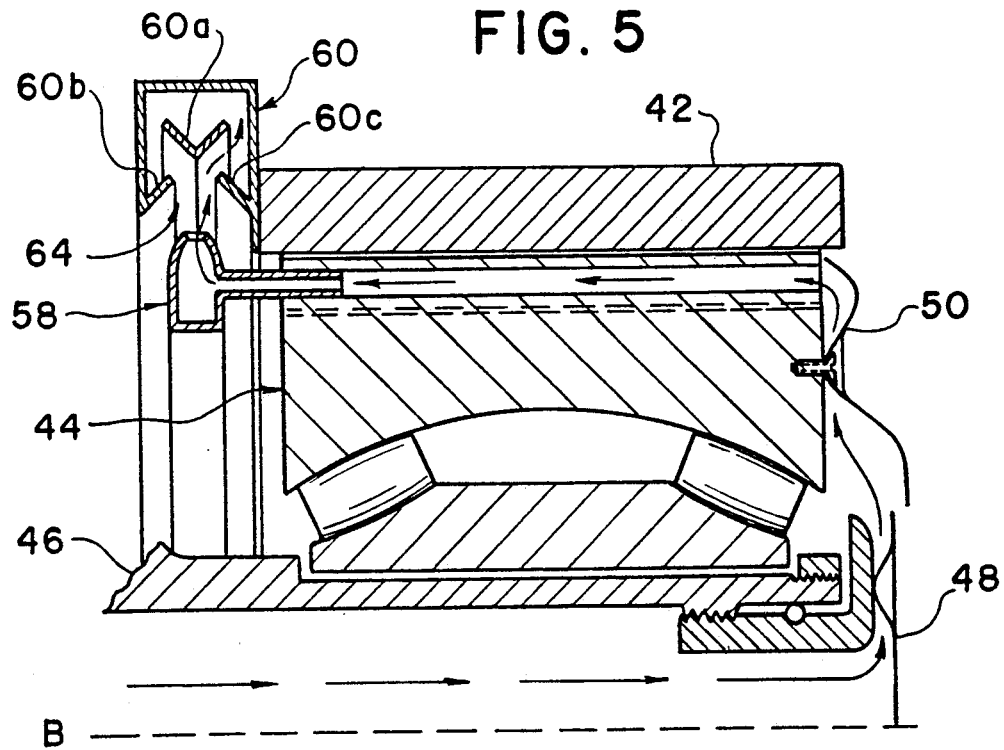

HIGH POWER GEAR COOLING SYSTEM

BACKGROUND OF THE INVENTION

1. Field of the Invention

The present invention relates generally to the field of power transmission through gearing and, more specifically, to a cooling system for high power gears.

2. Description of the Related Art

When two gears mesh, heat is generated as work is transferred from one gear to the other. In many types of drive trains, the rotary speed of the gears is such that lubrication, and heat removal, can be effected by immersion of at least a portion of the gears in a supply of lubricant. This may be performed in a variety of known ways, including having a gear extend into a sump of lubricant, or having oil pumped from a sump and distributed over the gears.

Gearing that uses immersion-type lubrication generally relates to machinery having engine output shafts rotating at speeds from a few hundred rpms to a few thousand, and under these circumstances heat can be removed by simply having an exterior surface of the sump exposed to an airflow. Moreover, at these relatively slow rpms, the immersion lubricant does not significantly impede rotation of the gears themselves.

Special lubrication problems for relatively slow gears have resulted in gear structures that include passageways for communicating lubricant therethrough. For example, in U.S. Pat. No. 4,771,864, issued to Lorimor et al., lubricant is supplied to a spline joint by providing a radially inwardly facing chamber at one end of the joint and filling the chamber with lubricant. An internal barrier assures a fixed internal radius and thus a predetermined centrifugal pressure head, while a plurality of venting passages located radially outwardly of the radius continually exhausts fluid from the splines as a result of centrifugal force so that fresh fluid is circulated through the splines.

U.S. Pat. No. 2,681,126, issued to Searls, shows lubrication of compound gears whereby channels are formed through bearings on which the gears are mounted. The gears form part of a gear changing-type gear box, and the purpose of the channels is to put lubricant on the gear teeth.

In a similar fashion, U.S. Pat. No. 4,696,201, issued to Hattori et al., describes a gear assembly in which lubricant is supplied through the gear shaft and channeled radially outwardly to the teeth through internal passages.

In high speed high power density gearing, such as the gearing found in aircraft gas turbine engines, the speed of the gears makes it unsuitable to use immersion-type lubrication. On the other hand, the high speed nature of the gears facilitates impingement-type lubrication whereby a small jet of lubrication is sprayed onto the gears, and the sprayed lubricant is collected and recirculated.

Heat becomes a more significant problem to a high speed gear box in that the heat generated where the gears mesh will be substantially greater due to the amount of power being transmitted. It is generally known to effect cooling by placing oil jets at the downstream side of the meshing zones of the gears so that the jetted oil is discharged directly at and impinges on the tooth flanks. Since the tooth-face temperature rise will be at its peak immediately after meshing, this location of the jet was considered to be best since most of the heat is at the surface of the teeth.

Typically, the oil is scavenged, after passing over the gear teeth, and then filtered and cooled before recycling through the gear box. In many gas turbine engines, the heated oil is placed in a heat exchanger in which the cooling fluid is the fuel immediately before it enters the combustion zone of the engine. Thus, the fuel is heated prior to combustion, and the oil is cooled by fuel.

Should a 50,000 horsepower jet engine experience a 1% loss to heat, 500 horsepower will be lost and 1,272,540 BTU/Hr will be generated, which must be disposed of. This loss will manifest itself in higher fuel consumption and a greater requirement to dissipate this energy. Additional cooling flow, which would be necessary for high power engines, will potentially give rise to additional heat losses, if introduced through normal lubrication jet systems. This is due to the fact that oil in excess of lubrication requirement will result in viscous losses.

In gear boxes associated with such engines, for example, in a high bypass ratio turbofan engine, it is very important to scavenge lubricant that is sprayed from the lubricant jets and remove it from the gear box as quickly as possible. Windage in the gear box, generated by motion of the gears at a very high speed, makes it difficult to scavenge oil. Moreover, gear box volume is extremely limited and thus scavenging problems become more severe. In other words, increasing the flow of oil through the lubricant jet system currently in place is not a desirable option for removing additional heat associated with high power gear boxes.

SUMMARY OF THE INVENTION

An object of the present invention is therefore to provide a high speed gear cooling system in which a separate flow circuit is provided for removal of heat, separate and apart from lubrication systems.

Another object of the present invention is to provide a high speed gear cooling system which minimizes splatter and lubricant impingement inside the gear box.

Another object of the present invention is to provide a high speed gear cooling system capable of scavenging all or nearly all of the cooling fluid that is introduced into the gear box.

These and other advantages of the invention are met by providing a cooling system for a gear having two opposite sides, circumferentially disposed teeth, and a rotation axis, which includes a plurality of passages extending from one side of the gear to the other through the gear at locations near the teeth, each passage being oriented substantially parallel to the rotation axis, jet means for spraying lubricant on one side of the gear near the passages, guide means located on the jet means side of the gear for guiding sprayed lubricants to the passages, scavenge means located on the opposite side of the gear for collecting lubricant after passing through the passages, and a pump having a pressure side coupled to the jet means and a vacuum side coupled to the scavenge means.

These and other features of the present invention will become more apparent with reference to the following detailed description and drawings.

BRIEF DESCRIPTION OF THE DRAWINGS

FIG. 3 is an enlarged sectional view similar to FIG. 1, showing a modified embodiment of the present invention;

FIG. 4 is a side elevational view of an insert optionally used in the gear passages of the present invention;

FIG. 4(a) is an end view of the insert of FIG. 4;

FIG. 5 is a partial, vertical sectional view of a planet gear showing a second preferred embodiment of the present invention;

DETAILED DESCRIPTION OF THE PREFERRED EMBODIMENTS

Figure 1:
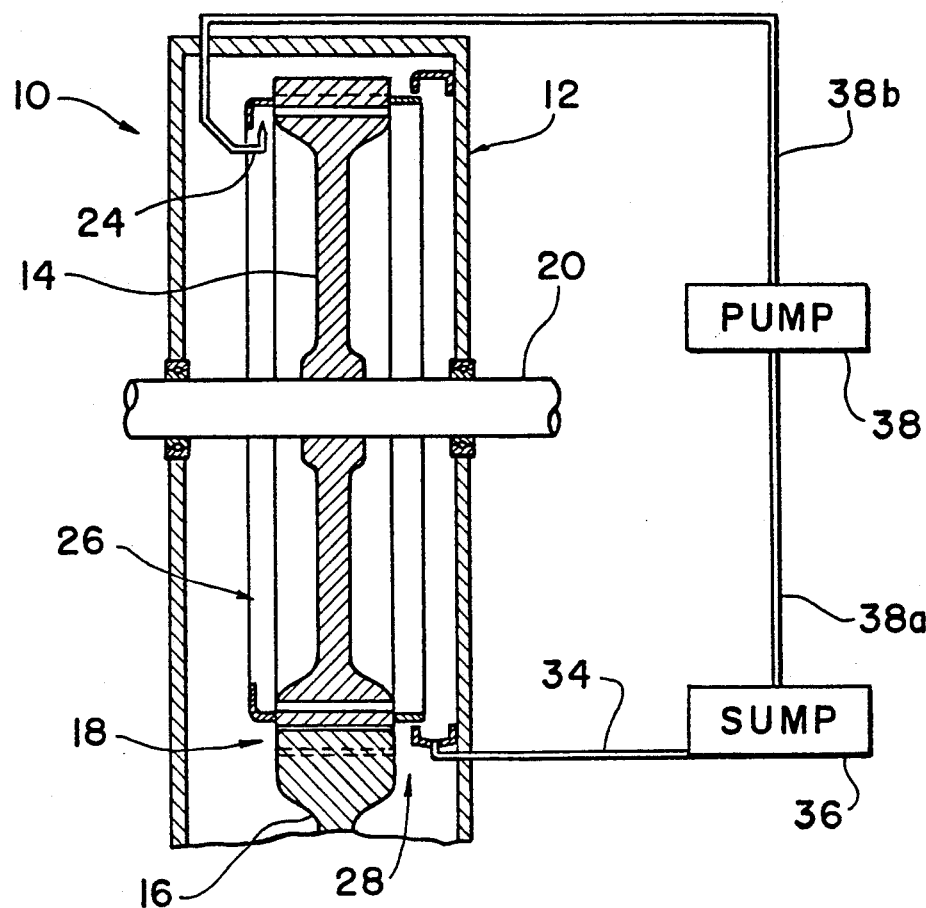
FIG. 1 is a simplified schematic view, partly in section, taken generally along line I—I of FIG. 2, showing a high speed gear cooling system according to the present invention.
Figure 2:
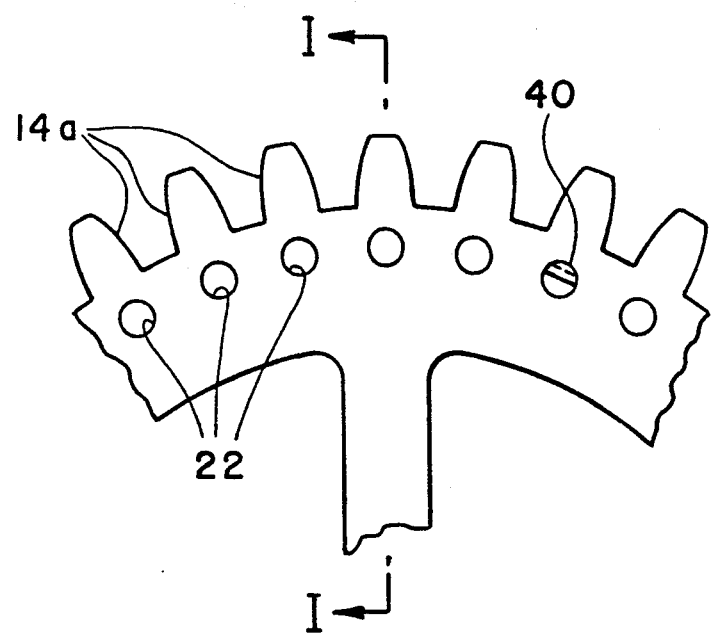
FIG. 2 is an enlarged side elevational view of a portion of the gear shown in FIG. 1.
Figure 6:
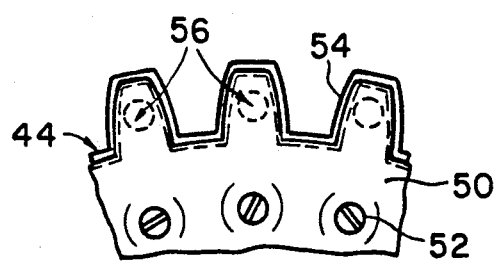
FIG. 6 is a fragmentary end view of the planet gear of FIG. 5, showing the collector shield in proximity to the gear teeth.
Figure 7:
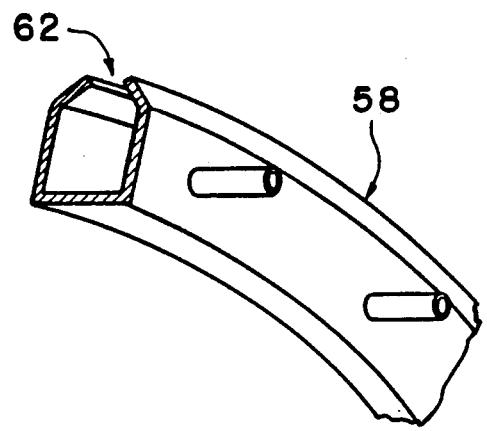
FIG. 7 is a partial perspective view, partly in section, showing the scavenge nozzle of FIG. 5.
Figure 8:
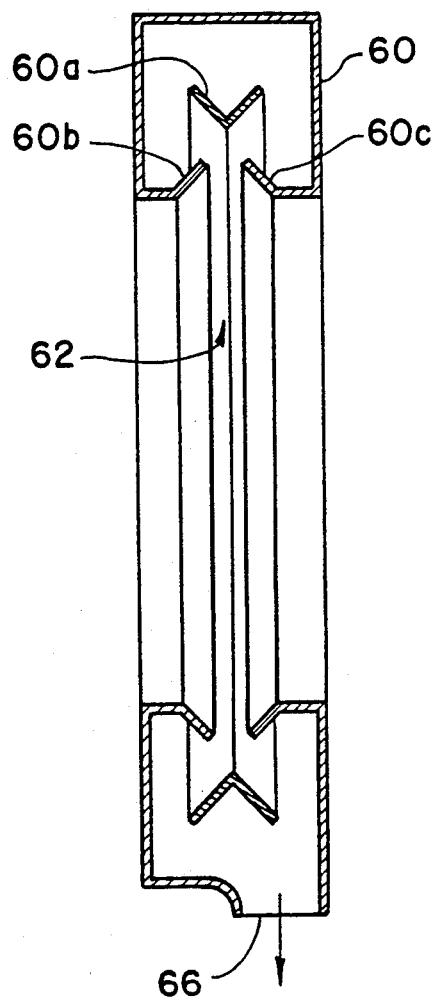
FIG. 8 is an enlarged vertical sectional view showing the collector ring of the embodiment of FIG. 5.
Figure 9:
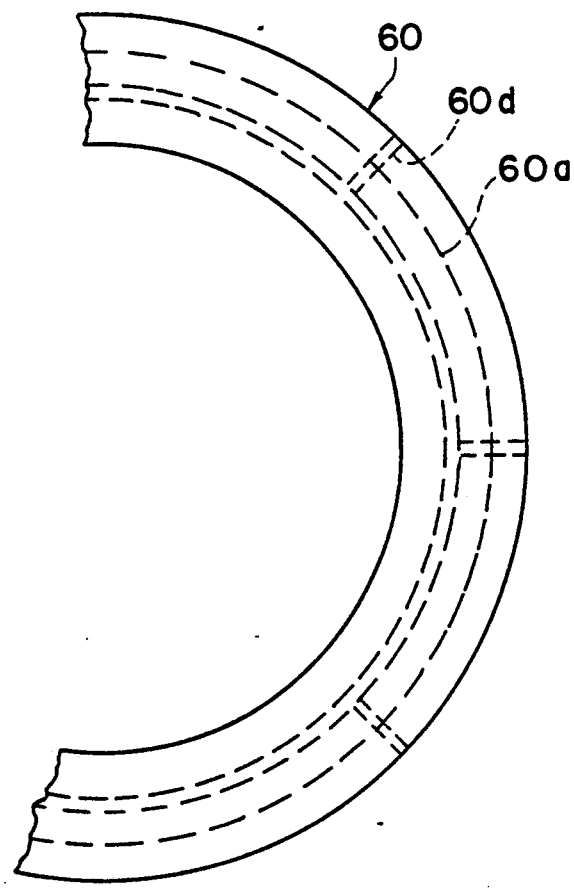
FIG. 9 is a partial top plan view of the collector ring of FIGS. 5 and 8.

Referring to FIG. 1, a cooling system for a gear is generally referred to by the numeral 10. The system 10 may be applied to any transmission in which highly loaded gears are rotated at extremely high speeds, as in gas turbine aircraft engines. For example, the reduction gearing between the fan and low pressure turbine of a high bypass turbofan engine rotate at extremely high speeds.

FIG. 1 is a simplified schematic view, in that a gear box 12 is illustrated as including only two gears 14 and 16 which mesh at 18. The two gears 14 and 16 are spur gears, but it should be readily understood that the present invention is not limited to spur gears and may include virtually any type of gear including epicyclic, planetary, bevel, etc.

The gear 14 is rotatable with shaft 20, which may be the output shaft of a gas turbine engine, in which case gear 14 would rotate at extremely high rpms. Heat generated by the mesh 18 is initially near the surface of the teeth but soon is conducted into the teeth and further into the annulus of the gear.

The present invention uses basic heat transfer principles to remove heat from the area of the gear teeth by circulating a coolant, such as lubricating oil through passages provided in the area of the teeth.

A plurality of passages extend through the gear from one side to the other at locations near the teeth 14a. In the illustrated embodiments which shows a spur gear, the passages 22 are substantially parallel to the rotation axis A of the gear 14. A cooling fluid, such as lubrication oil, is jetted or sprayed on one side of the gear 14 near the passages 22 by a jet nozzle 24. Spray jets have long been used in the industry for providing lubricating oil on high speed gearing. Typically, the lubrication is directed at the departure side of the mesh, impinging directly on the tooth pressure faces as they come out of contact. Although these spray jets are well known, a typical jet provided for lubrication can be seen in U.S. Pat. No. 4,667,774, issued to Roberge.

The present invention provides a separate cooling flow path and nozzles, separate and apart from whatever systems may be provided for lubricating purposes. Thus, although not illustrated, jets for spraying lubrication oil may be provided in the gear box 12 in order to facilitate gear lubrication.

A fundamental aspect of the present invention is that no fluid introduced for cooling purposes should be splattered loose in the gear box, and thus, the system 10 according to the present invention includes a guide lip 26 connected to one side of the gear 14. The guide lip 26 is an annulus that may be integrally formed with the gear, or separately attached by any conventional means including rivets, welding, etc. As seen in the drawings, the lip 26 is preferably L-shaped in cross section so as to include an axially extending portion 26a and a radially inwardly extending portion 26b.

On the opposite side of the gear 14, a scavenger 28 is provided. The scavenger 28 includes an annular collection ring 30 which is fixedly attached to the gear 14 and thus is rotatable therewith, and a collection scoop 32 which is stationary and is disposed in an enveloping relationship to a discharge end of the collection ring 30. The collection scoop 32 may be connected to an interior wall of the gear box 12, as illustrated in FIG. 1, or may be an integrally formed chamber in the wall of the gear box. A drain line is provided in the bottom of the collection scoop 32 and may be fed by gravity to a sump 36 from which the fluid is pumped by a pump 38 having a vacuum line 38a and a pressure line 38b, so that pressurized fluid can be fed back to the nozzle 24. The cooling fluid carries away a substantial portion of the total heat generated using a separate circuit other than the normal lube circuit. The coolant may or may not be lube oil and if it is, it may or may not share portions of the lube system outside the housing, meaning that pump 38 could be part of the lube circuit.

With respect to the gear teeth, the teeth may be hollow or holes drilled near all or some of the teeth. In the case of the illustrated spur gear, the holes are parallel to the axis of rotation, and in all embodiments, the holes serve several functions. First of all, they are cooling passages whereby cooling flows through the holes to effect heat transfer. The holes also have the effect of reducing gear weight, and the spring rate of the tooth, making it more compliant and reducing the Hertzian stress. This enhances load carrying ability and/or extends the life of the gears.

The cooling fluid can be introduced through means other than the illustrated nozzle 24. For example, the shaft 20 could be hollow to communicate fluid through the hollow shaft to channels provided in the gear hub, web and rim which could then communicate with passages such as passages 22. Alternatively, the fluid could be introduced through a hydraulic slip ring.

In another embodiment, a cooling adapter could be fitted to the gear. This adapter could be made similar to the blade retainer fitted to some aircraft engine turbine disks which serves the additional function of ducting cooling air to the blade roots. A similar device on the opposite side would collect the oil and return it to the shaft bore or to a scavenging hydraulic slip ring. A device similar to an aircraft engine labyrinth seal could also be located near the rim of the gear to scavenge the cooling flow without allowing the bulk of the flow to enter the lube wetted cavity.

Referring to FIG. 3, the collection ring 30 may optionally be provided with a grooved surface 31 so as to provide particulate collection means, thus allowing the cooling system to provide the additional function of filtering the cooling fluid.

The filtering aspect of the present invention can also be accomplished by providing a grooved insert 40, as shown in FIGS. 4 and 4(a), which is fitted into each of the passages 22. Each insert has a substantially semicircular shape in cross section and can be held in the passages by any conventional means including a press fit.

The present invention is not limited to spur gears and can easily be adapted to be used on epicyclic gearing systems, for example. Referring to FIGS. 5-9, an epicyclic gear system includes a ring gear 42 which meshes with a planet gear 44. The planet gear 44 rotates on a planet carrier pintle 46 which has a hollow core. During power transmission, the axis B of the carrier pintle 46 orbits around the axis of the ring gear 42, while the planet gear 44, which is a pinion, rotates around the axis B.

An inlet nozzle 48 is formed at the end of the carrier pintle so as to direct cooling oil from the end of the pintle towards an inlet collector 50. The collector 50 is attached to the face of the gear 44 by any suitable means, such as screws 52, and has an undulating perimeter which conforms substantially to the teeth 54 of the gear 44. Oil flows between the screws 52 and out towards the perimeter of the collector 50 where the oil is directed into passages 56 formed in the teeth 54 of the gear 44.

A scavenge nozzle 58 is attached to the opposite face of the gear 44 so as to direct oil which passes through the passages 56 into a collector ring 60. The scavenge nozzle 58 has an annular outlet opening 62 through which the cooling oil is directed towards the collector ring 60.

The collector ring 60 also has an annular opening 64 for receiving the oil directed therein by the scavenge nozzle 58. The scavenge nozzle 58 rotates with the gear 44 while the collector ring 60 remains stationary with the ring gear 42.

Preferably, the collector ring 60 is provided with baffling in the form of weirs 60a, 60b, and 60c so that oil sprayed into the ring inlet opening 64 drains by gravity to the outlet 66 rather than dripping back out of the inlet opening 64. The V-shaped weir 60a can be supported in the collector ring 60 by any suitable means, such as support posts 60d shown in FIG. 9. Thus, in the embodiment illustrated in FIGS. 5-9, a hydraulic slip ring is provided at both sides of the gear so as to allow oil to be circulated through the gear teeth while the gear 44 is rotating at an extremely high speed. In the embodiment of FIG. 5, the inlet nozzle 48 is stationary while the collector 50 rotates with gear, thus providing the first slip ring, while at the scavenge side, the nozzle 58 rotates while the collector ring 60 is stationary, thus providing the second slip ring. Cooling fluid, such as lubricating oil can be circulated through the cooling flow path illustrated in the embodiment of FIGS. 5-9 by feeding oil from the drain 66 to a sump and pump as in the previous embodiment and delivering pressurized fluid to the bore of the pintle 46. The nozzle 48 may have any suitable construction to provide an outlet from the end of the pintle 46 through which the oil can flow. The outlet can be a single opening or an arcuate opening having a length coinciding to a predetermined arc segment positioned in a predetermined vector which minimizes the effect of the very considerable centrifugal G-field created by the rotating gear 44.

A variation of the present invention takes into account that the cooling flow through the gear passages can be tapped as a source of lubricant for the gear teeth, so as to ensure that ultra-filtered lubricant is directed at the gear teeth. The filtration of the lubricant occurs, as previously discussed, due to the centrifugal separation of particulate matter from the lubricant as a result of the rotating gears.

Figure 10:
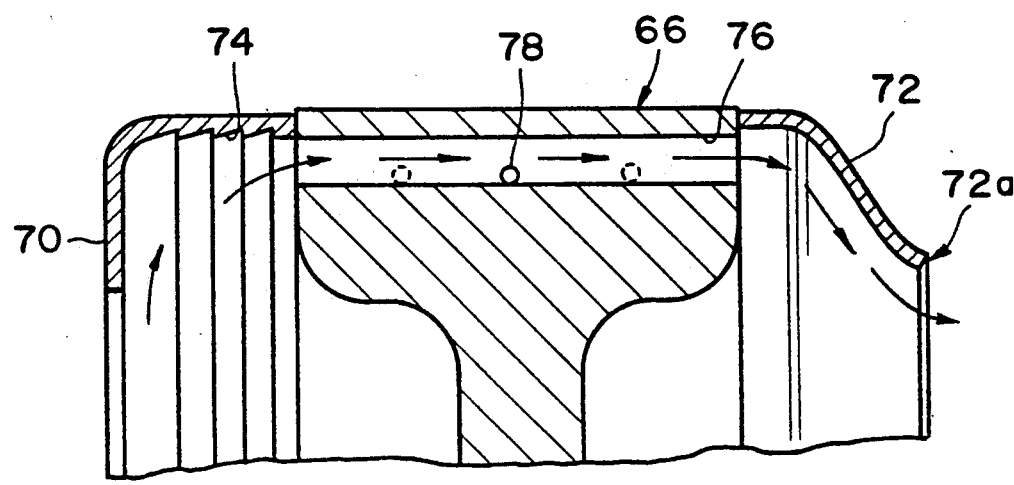
Fig. 10 is a partial, vertical sectional view of a spur gear incorporating another embodiment of the present invention.
Figure 11:
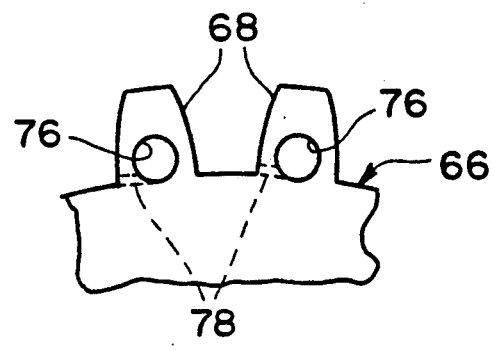
Fig. 11 is an enlarged side elevational view of the spur gear of FIG. 10.

By centrifuging out and trapping particulates while oil is subjected to the significant G-field near the gear wheel rim according to the present invention, unacceptably large particles are kept from the tooth pressure faces. An example is illustrated in FIGS. 10 and 11, in which a spur gear 66 having a plurality of peripheral teeth 68 is provided with a guide lip 70 on the inlet side of the gear 66 and a collector 72 on the opposite side. The guide lip 70 is provided with a serrated surface 74 so that particulate matter is trapped in the serrations and the thus filtered fluid passes through the passages 76. Due to the strong G-field in the gear, minute particles in oil flowing through the channels is centrifuged to the outer diameter sides of the channels. Small, radially directed weep holes 78 are formed in the passages 76 at the inner diameter side of the channels so as to extract the cleanest oil from the inner (closest to the axis of rotation) part of the cooling channels and deliver it to the meshing surfaces of the teeth.

The radius of the discharge lip 72a is inboard of the holes to ensure that the passages 76 run full. Thus, the embodiment of FIGS. 10 and 11 illustrates the combination of a cooling and lubricating system according to the present invention. The number and location of holes 78, within each channel, as well as the number and angular location of channels having weep holes, can be selected to correspond to lubrication requirements so as to either avoid a separate lubrication system, or supplement same.

What is claimed is:

1. A cooling system for a high speed gear having teeth comprising:
   a plurality of passages extending through the gear;
   means for delivering cooling fluid to the passages;
   scavenge means located in juxtaposition to the gear for collecting cooling fluid after passing through the passages; and
   means coupled to the delivering means and to the scavenge means for circulating cooling fluid through the system; and
   wherein the gear has two opposite sides, an axis of rotation, and the teeth are disposed circumferentially, and each of said passages extends in a direction substantially parallel to the rotation axis from an inlet on one side to an outlet on the other side through the gear at locations near the teeth.

2. A cooling system according to claim 1, wherein the delivering means comprises jet means for spraying cooling fluid on one side of the gear near the passages, and the system further comprises guide means located on the jet means side of the gear for guiding sprayed cooling fluid to the passages.

3. A cooling system according to claim 2, wherein the scavenge means is located on the opposite side of the gear and filters the cooling fluid.

4. A cooling system according to claim 3, wherein the guide means comprises a guide ring which forms a lip circumferentially around the passages, said guide ring including an axially extending portion protruding from the jet means side of the gear.

5. A cooling system for a high speed gear having teeth comprising:
a plurality of passages extending through the gear;
means for delivering cooling fluid to the passages;
scavenge means located in juxtaposition to the gear for collecting cooling fluid after passing through the passages; and
means coupled to the delivering means and to the scavenge means for circulating cooling fluid through the system;
wherein the gear has two opposite sides, an axis of rotation, and the teeth are disposed circumferentially, and the plurality of passages extend from one side to the other through the gear at locations near the teeth, each passage being oriented substantially parallel to the rotation axis;
wherein the delivering means comprises jet means for spraying cooling fluid on one side of the gear near the passages, and the system further comprises guide means located on the jet means side of the gear for guiding sprayed cooling fluid to the passages;
wherein the scavenge means is located on the opposite side of the gear;
wherein the guide means comprises a guide ring which forms a lip circumferentially around the passages; and
wherein the scavenge means comprises a collection ring connected to the gear on the side opposite the jet means, and a stationary collection scoop disposed around the collection ring.

6. A cooling system according to claim 5, wherein the collection ring has a grooved surface for collecting particulate matter.

7. A cooling system for a high speed gear having teeth comprising:
a plurality of passages extending through the gear;
means for delivering cooling fluid to the passages;
scavenge means located in juxtaposition to the gear for collecting cooling fluid after passing through the passages; and
means for circulating cooling fluid through the system, said circulating means coupled to the delivering means and to the scavenge means; and
wherein the circulating means comprises a pump having a pressure side coupled to the delivering means and a vacuum side coupled to the scavenge means.

8. A cooling system for a high speed gear having teeth comprising:
a plurality of passages extending through the gear;
means for delivering cooling fluid to the passages;
scavenge means located in juxtaposition to the gear for collecting cooling fluid after passing through the passages;
means coupled to the delivering means and to the scavenge means for circulating cooling fluid through the system; and
filtering means disposed in the plurality of passages for separating particulate matter from the cooling fluid; and
wherein the filtering means comprises a plurality of inserts, each being fitted into corresponding ones of the passages, and each having a plurality of grooves extending transverse the insert for collecting particulate matter.

9. A cooling system according to claim 1, wherein the delivering means comprises a first hydraulic slip ring and the scavenge means comprises a second hydraulic slip ring, wherein a stationary portion of said second slip ring is located in juxtaposition to a rotating portion of said second slip ring.

10. A cooling system according to claim 9, wherein the gear is a planet gear mounted on a pintle having a hollow bore, and wherein the first slip ring comprises an inlet nozzle provided at a distal end of the pintle, through which cooling fluid is directed, and a collector shield connected to the gear on one side thereof, said collector shield having an undulating perimeter conforming substantially to teeth of the planet gear.

11. A cooling system for a high speed gear having teeth comprising:
a plurality of passages extending through the gear;
means for delivering cooling fluid to the passage;
scavenge means located in juxtaposition to the gear for collecting cooling fluid after passing through the passages; and
means coupled to the delivering means and to the scavenge means for circulating cooling fluid through the system;
wherein the gear has two opposite sides, an axis of rotation, and the teeth are disposed circumferentially, and the plurality of passages extended from one side to the other through the gear at locations near the teeth, each passage being oriented substantially parallel to the rotation axis;
wherein the delivering means comprises a first hydraulic slip ring and the scavenge means comprises a second hydraulic slip ring;
wherein the gear is a planet gear mounted on a pintle having a hollow bore, and wherein the first slip ring comprises an inlet nozzle provided at a distal end of the pintle, through which cooling fluid is directed, and a collector shield connected to the gear on one side thereof; and
wherein the second hydraulic slip ring comprises a scavenge nozzle mounted on the opposite side of the gear from the collector shield, and a stationary collector ring mounted in opposing relationship to the scavenge nozzle to receive cooling fluid.

12. A cooling system according to claim 11, wherein the collector ring has an annular opening, an outlet disposed at a lower end of the collector ring, and baffle means disposed inside the collector ring for directing collected cooling fluid towards the outlet.

13. A cooling system for a high speed gear having teeth comprising:
a plurality of passages extending through the gear, each of said passages extending in a direction substantially parallel to an axis of rotation of the gear from an inlet on a first side of the gear to an outlet on an opposite side of the gear, said passages positioned proximate teeth of said gear;
a first slip ring for delivering cooling fluid to the passages;
a second slip ring for collecting cooling fluid after passing through the passages; and
means coupled to the first and second slip rings for circulating cooling fluid through the system.

14. A cooling system according to claim 13, wherein the gear is a planet gear mounted on a pintle having a hollow bore, and wherein the first slip ring comprises an inlet nozzle provided at a distal end of the pintle, through which cooling fluid is directed, and a collector shield connected to the gear on one side thereof, said collector shield having an undulating perimeter conforming substantially to teeth of the gear.

15. A cooling system for a high speed gear having teeth comprising:

a plurality of passages extending through the gear;

a first slip ring for delivering cooling fluid to the passages;

a second slip ring for collecting cooling fluid after passing through the passages; and means coupled to the first and second slip rings for circulating cooling fluid through the system;

wherein the gear is a planet gear mounted on a pintle having a hollow bore, and wherein the first sop ring comprises an inlet nozzle provided at a distal end of the pintle, through which cooling fluid is directed, and a collector shield connected to the gear on one side thereof; and wherein the second hydraulic slip ring comprises a scavenge nozzle mounted on the opposite side of the gear from the collector shield, and a stationary collector ring mounted in opposing relationship to the scavenge nozzle to receive cooling fluid.

16. A cooling system according to claim 15, wherein the collector ring has an annular opening, an outlet disposed at a lower end of the collector ring, and baffle means disposed inside the collector ring for directing collected cooling fluid towards the outlet.

17. A cooling system according to claim 13, wherein the cooling system further comprises means for trapping particulate matter, said trapping means positioned adjacent said inlets of said passages, and the plurality of passages includes at least one radial hole extending from at least one of the plurality of passages to an exterior surface of the gear.

* * * * *